US012716578B2

(12) United States Patent
Jiang et al.

(10) Patent No.: US 12,716,578 B2
(45) Date of Patent: Aug. 25, 2026

(54) FOLDABLE HANDLE AND STAGE LIGHT FIXTURE HAVING SAME

(71) Applicant: Guangzhou Haoyang Electronic Co., Ltd., Guangzhou (CN)

(72) Inventors: Weikai Jiang, Guangzhou (CN); Jun Luo, Guangzhou (CN); Zhiqiang Chen, Guangzhou (CN); Weilong Zhan, Guangzhou (CN); Renping Ye, Guangzhou (CN)

(73) Assignee: Guangzhou Haoyang Electronic Co., Ltd., Guangzhou (CN)

( * ) Notice: Subject to any disclaimer, the term of this patent is extended or adjusted under 35 U.S.C. 154(b) by 280 days.

(21) Appl. No.: 18/650,916

(22) Filed: Apr. 30, 2024

(65) Prior Publication Data

US 2025/0137628 A1 May 1, 2025

(30) Foreign Application Priority Data

Oct. 31, 2023 (CN) ......................... 202322944493.1
Oct. 31, 2023 (CN) ......................... 202322945455.8

(51) Int. Cl.
*F21V 21/26* (2006.01)
*F21V 21/40* (2006.01)
*F21W 131/406* (2006.01)

(52) U.S. Cl.
CPC .............. *F21V 21/26* (2013.01); *F21V 21/40* (2013.01); *F21W 2131/406* (2013.01)

(58) Field of Classification Search
CPC ................................ F21V 21/26; F21V 21/40
USPC ........................................ 362/287, 399, 427
See application file for complete search history.

(56) References Cited

U.S. PATENT DOCUMENTS

| | | | | |
|---|---|---|---|---|
| 6,419,377 | B1 * | 7/2002 | Yuen | F21L 14/02 362/399 |
| 2005/0072789 | A1 * | 4/2005 | Einav | B25H 3/02 220/756 |
| 2011/0074169 | A1 * | 3/2011 | Chang | G11B 33/124 292/164 |
| 2021/0122403 | A1 * | 4/2021 | Ostergaard | B62B 5/064 |

* cited by examiner

*Primary Examiner* — Thomas M Sember
(74) *Attorney, Agent, or Firm* — MUNCY, GEISSLER, OLDS & LOWE, P.C.

(57) ABSTRACT

A foldable handle includes a base bar, a steering lever pivoted to the base bar, and a movable retaining element. The steering lever has two states relative to the base bar, including a folding state where the steering lever is substantially perpendicular to the base bar and an unfolding state where the steering lever is substantially in the same line with the base bar. The steering lever is configured in a way that in the unfolding state a first side of the steering lever is blocked by a side plate protruded from an end of the base bar to restrict the steering lever to rotate forward. The retaining element is configured to move to be abutted against a second side of the steering lever opposite to the first side blocked by the side plate to restrict the steering lever to rotate backward in the unfolding state of the steering lever.

20 Claims, 13 Drawing Sheets

FOLDABLE HANDLE AND STAGE LIGHT FIXTURE HAVING SAME

CROSS REFERENCE TO RELATED APPLICATIONS

The present application claims priorities from Chinese Application No. CN 202322944493.1 filed on Oct. 31, 2023 and Chinese Application No. CN 202322945455.8 filed on Oct. 31, 2023, all of which are hereby incorporated herein by reference.

TECHNICAL FIELD

The present invention relates to the technical field of stage light fixtures, and more particularly, relates to a foldable handle and a stage light fixture having the same.

BACKGROUND

As auxiliary devices for performance on stage, the stage light fixtures are usually required transport form one place to another place. It is well known to provide handles on the stage light fixture for holding, thereby conveniently lifting the stage light fixture. A great many types of air beds are known to exist, such as handles fixedly arranged on the stage light fixture and foldable handles through rotating or telescoping control. However, the former kind of handles would additionally occupy spaces and the latter kind of handles would only allow uses to lift the stage light fixture in forward direction.

In addition, the stage light fixture in some cases is required to be arranged or used reversely or in backward direction. It is hard to achieve lifting reversely or in backward direction for the prior foldable handles.

It is therefore desirable to provide a foldable handle which can adjust lifting direction according to different scenarios and meet different demands.

SUMMARY

It is therefore an object of the present invention to provide a foldable handle and a stage light fixture having the foldable handle, which is free from the aforesaid drawbacks of the prior art, namely it can adjust lifting direction according to different scenarios and meet different demands of lifting in forward direction and lifting reversely or in backward direction, meanwhile without occupying additional space.

In a first aspect, the present invention provides a foldable handle, which includes a base bar, a steering lever pivoted to the base bar, and a movable retaining element. The steering lever has two states relative to the base bar, including a folding state where the steering lever is substantially perpendicular to the base bar and an unfolding state where the steering lever is substantially in the same line with the base bar, and the steering lever is configured in a way that in the unfolding state a first side of the steering lever is blocked by a side plate protruded from an end of the base bar to restrict the steering lever to rotate forward. The retaining element is configured to move to be abutted against a second side of the steering lever opposite to the side blocked by the first side plate to restrict the steering lever to rotate backward in the unfolding state of the steering lever.

In the present invention, the steering lever is pivoted to the base bar and rotable relative to the base bar, so that the steering lever has two states of folding state for storage and unfolding state for use. When in the unfolding state for use, the steering lever is restricted to rotate forward by the side plate and restricted to rotate backward or reversely by the movable retaining element, the steering lever in the present invention thus can be applied both upward force and downward force, thereby achieving demands of lifting the stage light fixture in the forward direction and in the backward direction.

In order to allow automatic movement of the retaining element, an elastic element is provided. Under action of the elastic element, the retaining element is always abutted against the steering lever during rotation of the steering lever and is automatically moved to be abutted against the second side of the steering lever in the unfolding state of the steering lever. With the elastic element, it can avoid manual movement of the retaining element, thereby increasing convenience and facilitation.

The retaining element may be in form of a movable sleeve which is sleeved on the base bar, the movable sleeve is configured to move along the length direction of the base bar in the unfolding state of the steering lever until to be sleeved on the side plate of the base bar and abutted against the second side of the steering lever opposite to the side blocked by the side plate. In such configuration, when the steering lever is at the unfolding state, the movable sleeve surrounds both the base bar and the steering lever, especially with one inner side of the movable sleeve abutted against the side plate and opposite inner side thereof abutted against the steering lever, thus restricting relative rotation of the steering lever relative to the base bar. In addition, with such configuration the movable sleeve can be concealed with the base bar, which will not be sometimes hidden and sometimes visible with rotation of the steering lever.

A guide bar may be further provided for guiding movement of the movable sleeve, which allows the movable sleeve to move along a certain direction and thus avoids deviation and lagging. Preferably two guide bars are provided.

In a bid to manually move the movable sleeve even it is designed very thin, an unlocking plate may be further provided, with at least portion of the unlocking plate protruded outside from the movable sleeve. In such easy way, rotation of the steering lever can be manually locked or unlocked readily.

As an alternative, an end of the base bar is recessed to form a limiting hole which is configured to support the retaining element and guide movement of the retaining element, and the retaining element is configured to move along the limiting hole to abutted against the second side of the steering lever in the unfolding state of the steering lever. With the configuration of the limiting hole, the retaining element is nearly invisible, which is more aesthetic pleasing. The limiting hole on the one hand provides resistance to the steering lever for further rotation by supporting the retaining element, on the other hand it provides guide for movement of the retaining element.

In this case, an additional side plate opposite to the side plate restricting forward rotation of the steering lever is further formed, and a side of the retaining element away from the steering lever is abutted against the additional side plate in the unfolding state of the steering lever. According to the present invention, the side plate can provide more support for the retaining element, making the force receiving point of the steering lever in reverse rotation away from the joint of the steering lever and the base bar and reducing force at the force receiving point.

To make the force receiving point of the steering lever in forward rotation is away from the joint of the steering lever and the base bar and reduces force at the force receiving point, starting from the joint of the steering lever and the base bar, the steering lever is extended along a length direction thereof towards the base bar to form a supporting segment, and the steering lever is cooperated with the side plate and the retaining element through the supporting segment.

More preferably, a side of an end of the supporting segment facing the side plate is roundly chamfered. In this way, during rotation from the folding state to the unfolding state of the steering lever, the retaining element is pushed towards the elastic element until located between the retaining element and the side plate, where the retaining element is abutted against the side of the retaining element opposite to the side abutted against the side plate under the force of the elastic element, the retaining element thus is restricted to rotate reversely or backward.

Additionally, an additional side plate opposite to the side plate restricting forward rotation of the steering lever is further formed, a side of the retaining element away from the steering lever is abutted against the additional side plate in the unfolding state of the steering lever, and the side plate is provided with an avoiding groove corresponding to the supporting segment of the steering lever, especially for passing through the supporting segment of the steering lever. As such, the supporting segment can be designed much longer without increasing distance between the two side plates.

In order to prevent the retaining element from wobbling in the limiting hole, an end of the retaining element close to the steering lever is extended along the base bar to form a guide protrusion which is configured to guide the retaining element cooperated with the limiting hole.

In particular, an unlocking plate connected to the guide protrusion is further provided to manually move the retaining element, with at least portion of the unlocking plate protruded outside from the retaining element. With the unlocking plate, the retaining element can be moved manually to lock or unlock rotation of the steering lever.

The present invention further provides an alternative unlocking mechanism. In this unlocking mechanism, the supporting segment of the steering lever has a supporting shoulder, in the unfolding state of the steering lever, the retaining element is abutted against the supporting shoulder to restrict backward rotation of the steering lever; a penetrating hole is formed along a length direction of the steering lever and penetrated an end surface of the supporting segment, an unlocking bar is provided in the penetrating hole, which is able to reach out the penetrating hole to push the retaining element to move from the supporting shoulder to release restriction of the retaining element to the steering lever. In such design, the unlocking mechanism is concealed, which is more aesthetic pleasing as well as space-saving, also avoiding injury to the users caused by scratching from the unlocking mechanism.

In order to make the center of the penetrating hole and the steering lever coincide and thus reduce thickness of the steering lever while ensuring strength thereof, the penetrating hole is designed to penetrate both end surfaces of the supporting segment and the supporting shoulder.

The unlocking bar is required to automatically reset after it is pressed to unlock the retaining element so as to avoid influence on rotation of the steering lever. For the purpose of this, an end of the penetrating hole away from the supporting segment has a widening section in which a reset spring is arranged, an end of the unlocking bar away from the supporting segment has an expanding portion, and the unlocking bar is run through the reset spring with the expanding portion abutted against the reset spring.

A base plate for fastening the foldable handle may be further included in each case, and an end of the base bar away from the steering lever is connected to the base plate. With configuration of the base plate, it makes the foldable handle to be an independent component, so that the foldable handle can be fastened only by fastening the base plate, which is user-friendly for fastening the handle of the present invention.

For comfortable use, an end of the steering lever away from the base bar is connected with a holding bar which is substantially perpendicular to the steering lever. In such easy way, the steering lever can be comfortably hold and operated to lift the object having the handle.

In a second aspect, the present invention further provides a stage light fixture, which includes a light head for project light beams; a supporting arm for supporting the light head to rotate; a base for supporting the supporting arm to rotate; and the foldable handle in each case mentioned above, the foldable handle may be arranged at the light head, the supporting arm, or the base.

The foldable handle is preferably arranged at the supporting arm and especially below a rotating axis of the light head relative to the supporting arm. As the rotating axis of the light head is usually close to the center of gravity of the stage light fixture, such configuration can avoid overturning when moving the stage light fixture. In addition, there are enough spaces below the rotating axis of the light head where the handle can be arranged easily.

Particular preference is given to making the handle concealed and ensuring the light fixture more aesthetic pleasing, a housing of the supporting arm is provided with an accommodating groove for receiving the foldable handle.

Additional advantages, features and possible applications of the present invention will be apparent from the description which follows, in which reference is made to the embodiments illustrated in the drawings

DETAILED DESCRIPTION

Figure 1:
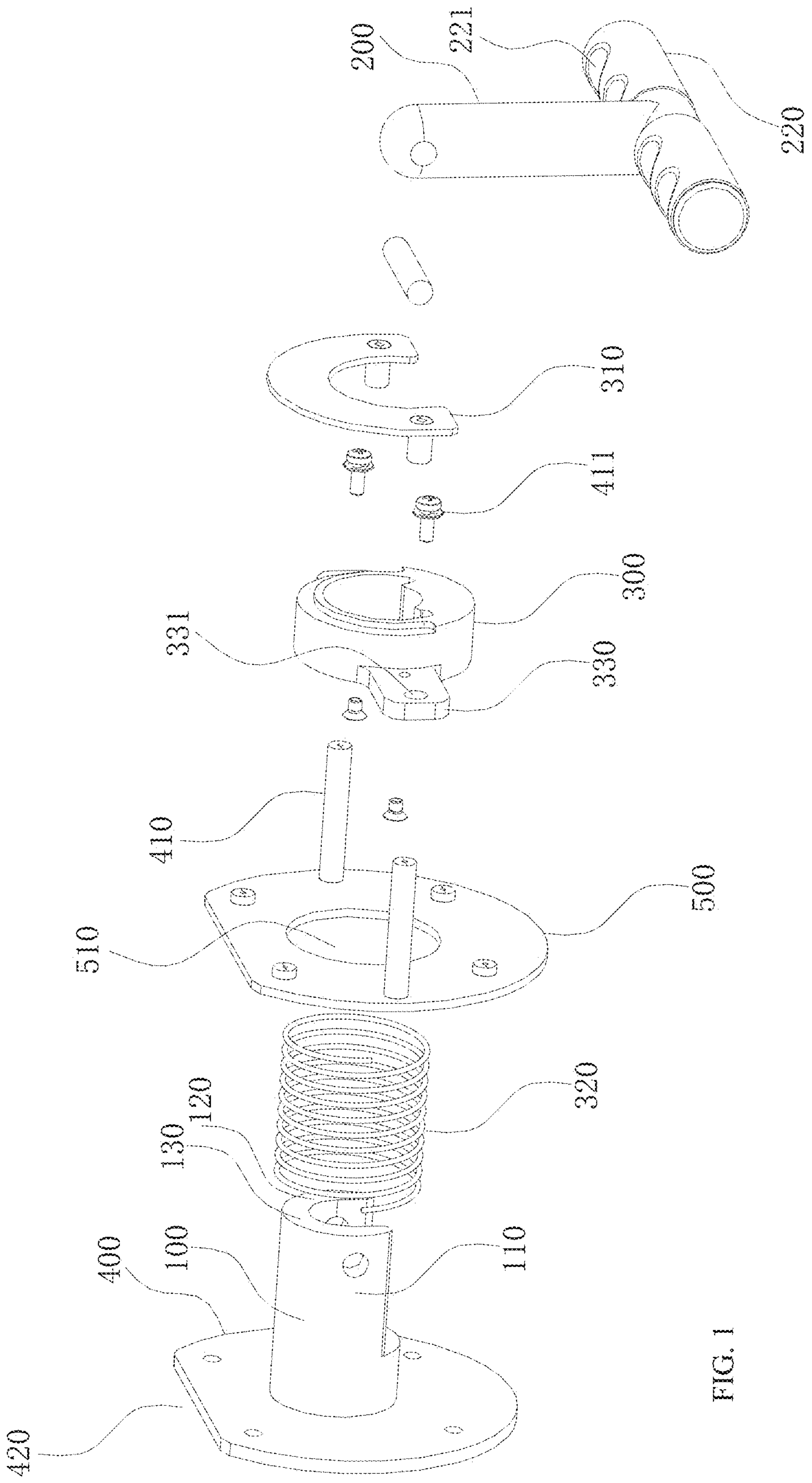
FIG. 1 is an exploded view of a foldable handle according to an embodiment of the present invention.
Figure 2:
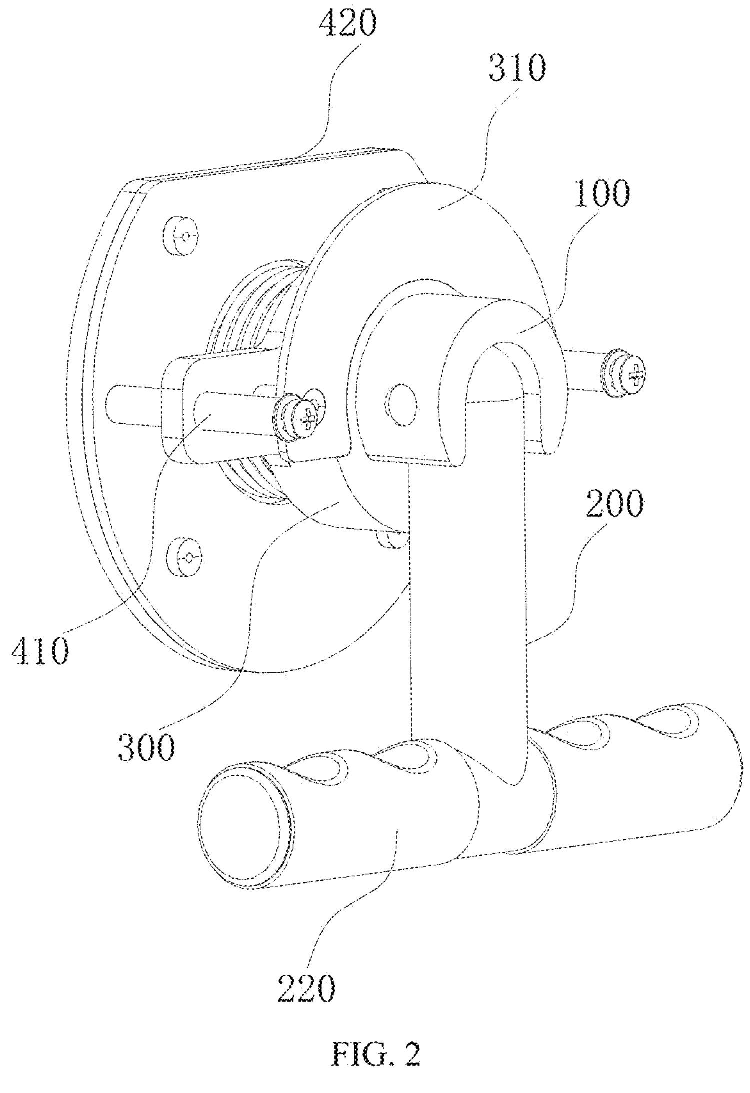
FIG. 2 is a perspective view of the foldable handle of FIG. 1 at a folding state.
Figure 3:
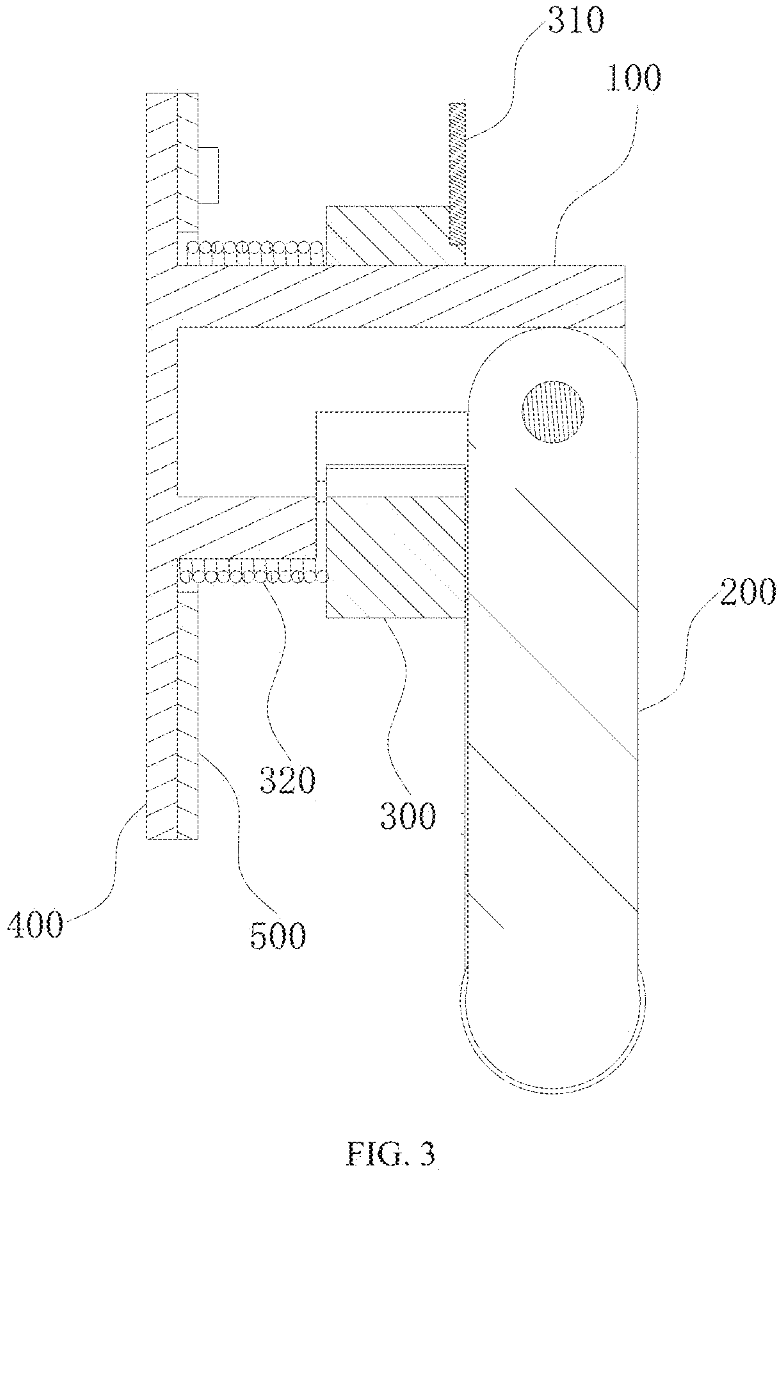
FIG. 3 is a cutaway view of the foldable handle of FIG. 1 at a folding state, along a length direction of a base bar of the foldable handle.
Figure 4:
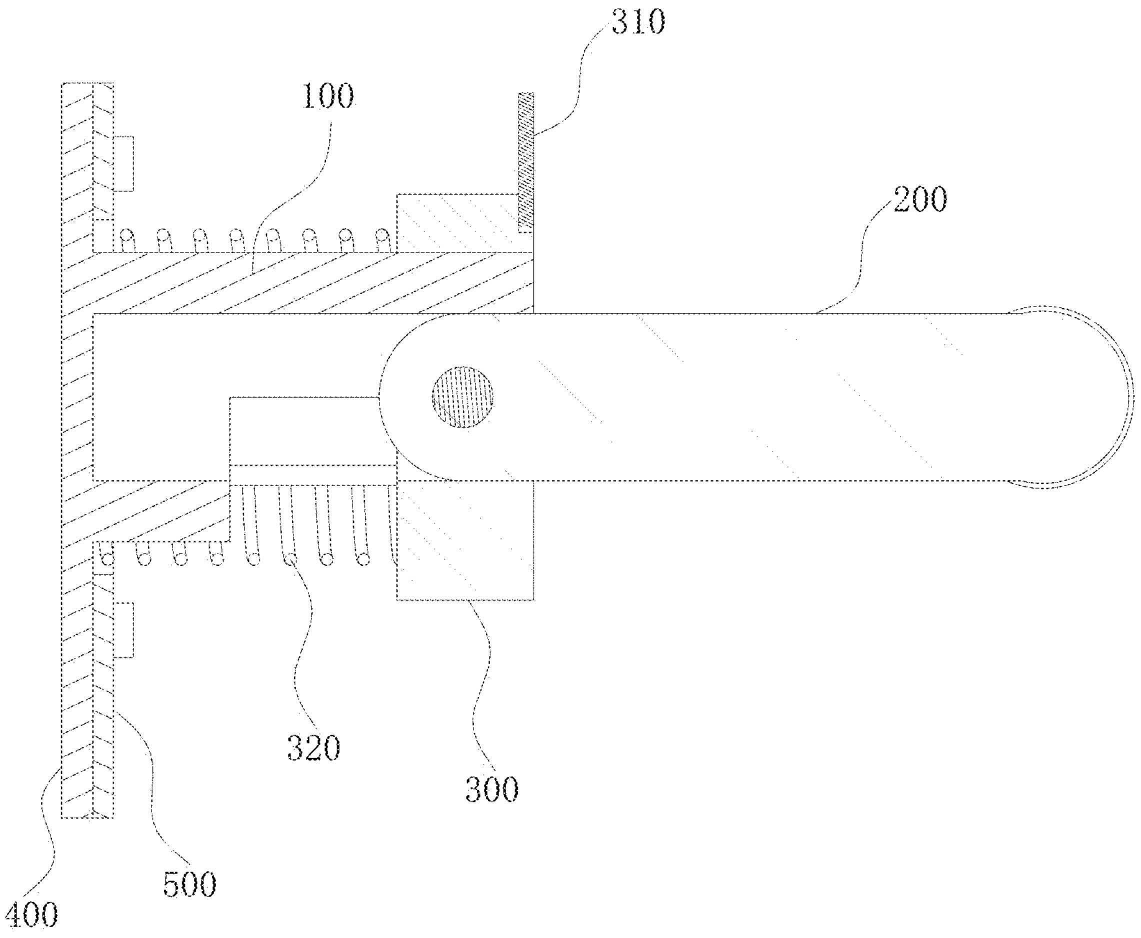
FIG. 4 is a cutaway view of the foldable handle of FIG. 1 at an unfolding state, along a length direction of a base bar of the foldable handle.

The accompanying drawings are for exemplary illustration only, and should not be construed as limitations on this invention. In order to better illustrate the present embodiment, some parts of the accompanying drawings may be omitted, enlarged or reduced, and do not represent the size of actual products. For those skilled in the art, it is understandable that certain well-known structures and descriptions thereof may be omitted in the drawings. The positional relationship described in the drawings is only for exemplary illustration, and should not be construed as a limitation on this invention.

FIGS. 1 to 4 provide a foldable handle according to an embodiment of the present invention. Referring to FIG. 1, the foldable handle in this embodiment includes a movable retaining element 300, a base bar 100 and a steering lever 200 pivoted to the base bar 100. The steering lever 200 has two states relative to the base bar 100, including a folding state where the steering lever 200 is substantially perpendicular to the base bar 100 (shown in FIG. 2 and FIG. 3) and an unfolding state where the steering lever 200 is substantially parallel to the base bar 100 (shown in FIG. 4), especially in the same line with the base bar 100. The steering lever 200 is configured in a way that in the unfolding state one side of the steering lever 200 is blocked by a side plate 130 protruded from an end of the base bar 100 to restrict the steering lever 200 to rotate forward, meanwhile in the unfolding state the retaining element 300 is moved to abut against the opposite side of the steering lever 200 to restrict the steering lever 200 to rotate backward or reversely, clearly shown in FIG. 4.

In the present embodiment, the steering lever 200 is pivoted to the base bar 100 and rotable relative to the base bar 100, so that the steering lever 200 has two states of folding state for storage and unfolding state for use. When in the unfolding state for use, the steering lever 200 is restricted to rotate forward by the side plate 130 and restricted to rotate backward or reversely by the movable retaining element 300, the steering lever 200 thus can be applied both upward force and downward force, thereby achieving demands of lifting the stage light fixture in the forward direction and in the backward direction.

The base bar 100 additionally has two opposite side plates 110, 120 perpendicular to the side plate 130. Two ends of the steering lever 200 are respectfully pivoted to the first side plate 110 and the second side plate 120.

According to a preferable embodiment, an elastic element 320 is further provided. Under action of the elastic element 320, the retaining element 300 is always abutted against the steering lever 200, regardless of the steering lever 200 rotating forward or backward, and the retaining element 300 is automatically moved to abut against the side of the steering lever 200 opposite to the side blocked by the side plate 130. With the elastic element 320, the retaining element 300 can automatically move until it retains the steering lever 200 to restrict further rotation during rotation of the teering lever 200 form the folding state to the unfolding state, which can avoid manual movement of the retaining element 300, increasing convenience and facilitation.

The elastic element 320 is preferably a spring.

Especially, under action of the elastic element 320, one end of the retaining element 300 is always abutted against the steering lever 200 during backward or forward rotation of the steering lever 200, and the retaining element 300 is automatically moved to abut against the side of the steering lever 200 opposite to the side thereof blocked by the side plate 130, when the steering lever 200 is in the unfolded state.

Of course, the elastic element 320 may be not provided in some embodiments. In such case, the retaining element 300 is manually moved to lock or unlock rotation of the steering lever 200.

In this embodiment, the retaining element 300 is in form of a movable sleeve which is sleeved on the base bar 100. In such case, referring to FIG. 2 and FIG. 3, when the steering lever 200 is at the folding state, one end of the movable sleeve is abutted to the steering lever 200. While during rotation of the steering lever 200 from the folding state to the unfolding state, referring to FIG. 4, the movable sleeve is moved along the length direction of the base bar 100 until sleeved on the side plate 130, where the inner side thereof abutted against the side of the steering lever 200 opposite to the side thereof blocked by the side plate 130. That is, at the unfolding state of the steering lever the movable sleeve surrounds both the base bar 100 and the steering lever 200, with one inner side of the movable sleeve abutted against the side plate 130 and opposite inner side thereof abutted against the steering lever 200, thus restricting relative rotation of the steering lever 200 relative to the base bar 100. In addition, with such configuration the movable sleeve can be concealed with the base bar 100, which will not be sometimes hidden and sometimes visible with rotation of the steering lever 200.

In the present embodiment, the elastic element 320 is sleeved on the base bar 100, with one end abutted against the movable sleeve. Preferably, the movable sleeve is sleeved on a place close to the joint of the steering lever 200 and the base bar 100 and preferably located at the joint when the steering lever 200 is at the unfolded state. For the purpose of this, the inner side wall of the movable sleeve has a shape engaged with the joint of the steering lever 200 and the base bar 100.

More preferably, in the unfolded state the inner side wall of the movable sleeve is engaged with the joint of the steering lever 200 and the base bar 100 in a way that the movable sleeve is tightly contacted to the outside of the base bar 100 and the steering lever 200, which can avoid casual displacement or wobble when in use.

In the present embodiment, the movable sleeve restricts reverse rotation of the steering lever 200 in a way that the movable sleeve is sleeved on the outside of all the side plates 110, 120, 130 and the inner side wall of the movable sleeve is abutted against the side of the steering lever 200 opposite to the side thereof blocked by the side plate 130.

In a preferable embodiment, a guide bar 410 is further provided for guiding movement of the movable sleeve. The guide bar 410 allows the movable sleeve to move along a certain direction and thus avoids deviation and lagging. Preferably two guide bars 410 are provided.

Particularly, the movable sleeve vertically extends outside to form a limiting plate 330 with through holes 331, the guide bars 410 respectively run through the guide bars 410.

The end of each guide bar 410 is fixed by a fastener which forms a limiting portion 411 of the respective guide bar 410.

With the limiting portion 411, the movable sleeve can be positioned to the joint of the steering lever 200 and the base bar 100 when in the unfolded state.

The movable sleeve is further provided with an unlocking plate 310 according to a preferable embodiment, through which the movable sleeve can be moved manually, with at least portion of the unlocking plate 310 protruded outside from the movable sleeve. With the unlocking plate 310, the movable sleeve can still be moved manually even it is designed very thin. In such easy way, rotation of the steering lever 200 can be manually locked or unlocked readily.

In the present embodiment, the unlocking plate 310 is in a sector-annular shape, which is fastened to the movable sleeve by fastens and protruded outside from the movable sleeve.

The base bar 100 and the steering lever 200 may be respectively provided with a positioning protrusion and a positioning recess (not shown in the drawings) at the joint. In such case, when the steering lever 200 is rotated to the unfolding state, a resistance force will be applied to the steering lever 200 with cooperation of the positioning protrusion and positioning recess or the steering lever 200 is slightly locked, so that the movable sleeve can be moved to the joint and lock the steering lever 200 easily.

In this embodiment, the steering lever 200 is rotated in the vertical direction.

FIGS. 5 to 8 illustrate a foldable handle according to another embodiment of the present invention. Same features with the embodiment shown in FIGS. 1 to 4 are indicated by same reference numbers.

Figure 5:
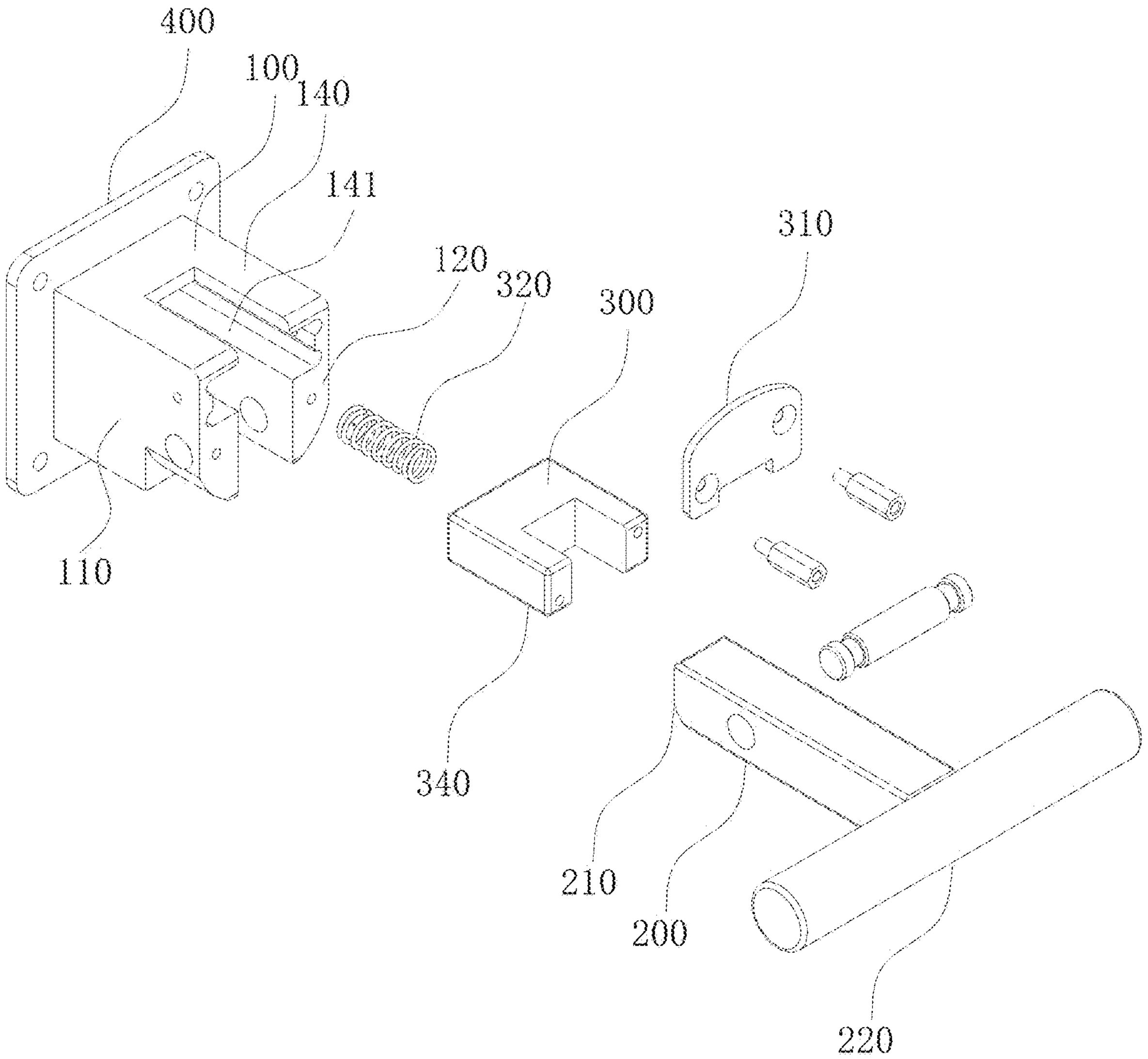
FIG. 5 is an exploded view of a foldable handle according to another embodiment of the present invention.
Figure 6:
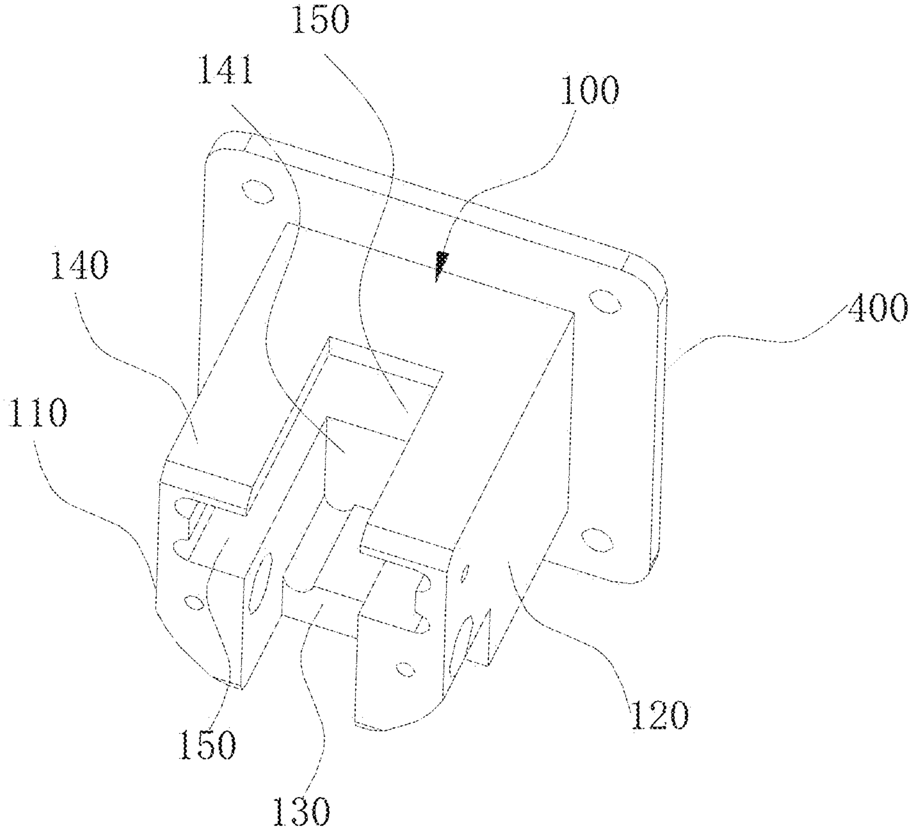
FIG. 6 is a perspective view of a base bar of the foldable handle of FIG. 5.

In combination with FIG. 5 and FIG. 6, at its end the base bar 100 is recessed to form a limiting hole 150 which supports the retaining element 300 and guides movement of the retaining element 300. In this way, thus no additional guide element is required.

Figure 7:
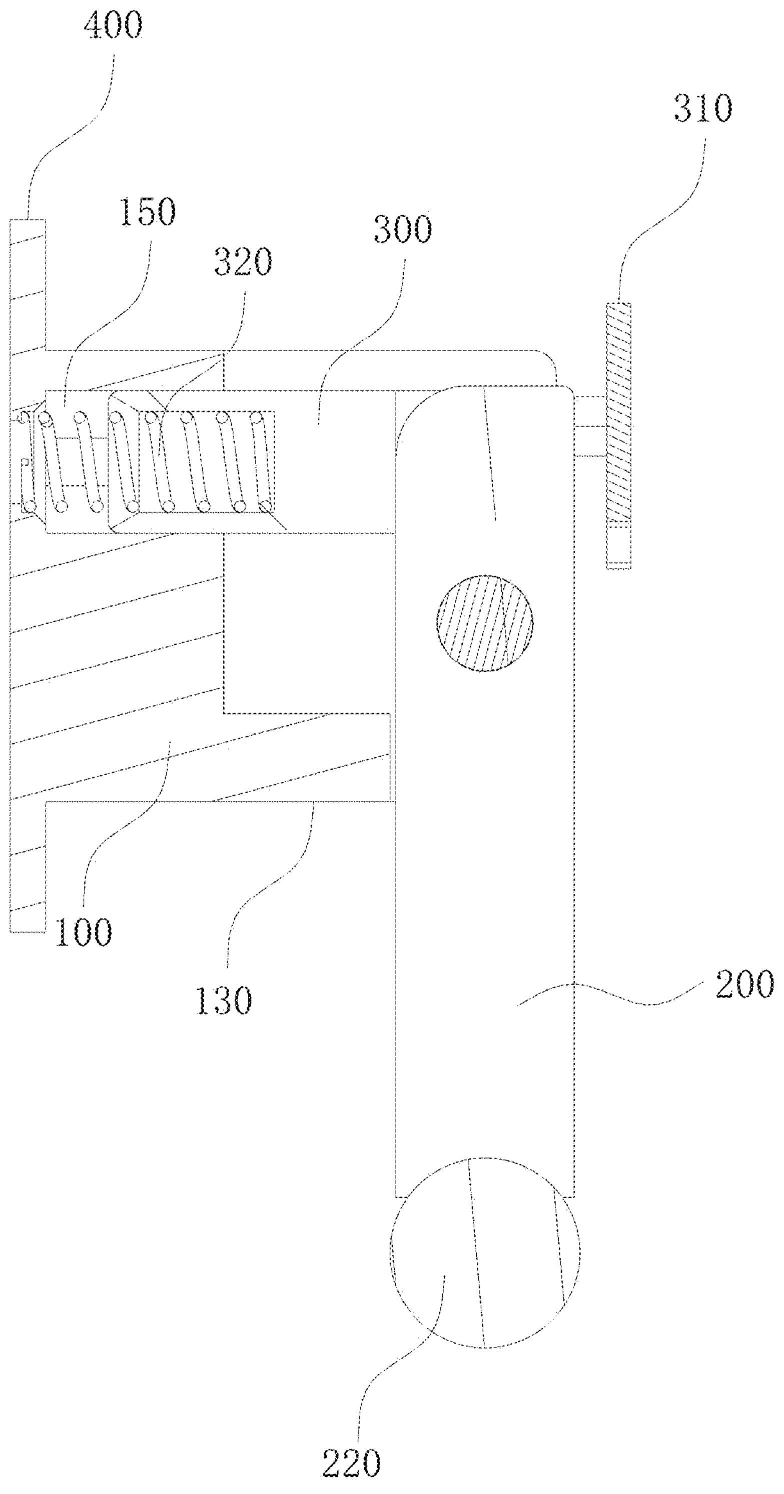
FIG. 7 is a cutaway view of the foldable handle of FIG. 5 at a folding state, along a length direction of a base bar of the foldable handle.

FIG. 7 depicts the steering lever 200 in the folding state. In this state the side plate 130 and the retaining element 300 are located at the same side of the steering lever 200.

Figure 8:
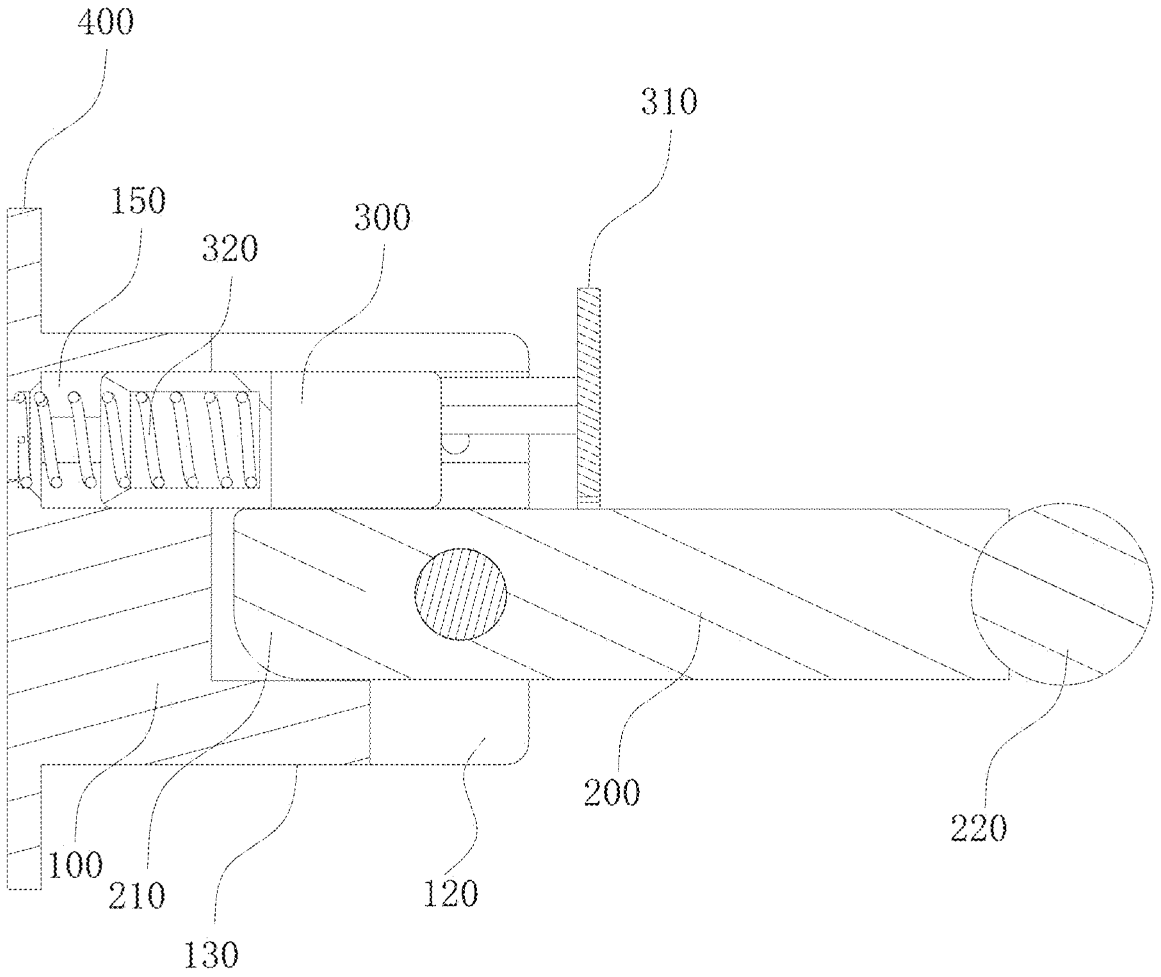
FIG. 8 is a cutaway view of the foldable handle of FIG. 5 at an unfolding state, along a length direction of a base bar of the foldable handle.

FIG. 8 depicts the steering lever 200 in the unfolding state. In this state the steering lever 200 is located between the side plate 130 and the retaining element 300 so that movement of the steering lever 200 is restricted. Particularly, the retaining element 300 is moved along the limiting hole 150 to abutted against the side of the steering lever 200 opposite to the side abutted against the side plate 130. With the configuration of the limiting hole 150, the retaining element 300 is nearly invisible, which is more aesthetic pleasing. The limiting hole 150 on the one hand provides resistance to the steering lever 200 for further rotation by supporting the retaining element 300, on the other hand it provides guide for movement of the retaining element 300.

The elastic element 320 is also arranged in the limiting hole 150 with one end abutted against the retaining element 300.

The base bar 100 further includes another side plate 140 opposite to the side plate 130. The side of the retaining element 300 opposite to the side abutted against the steering lever 200 is abutted against the side plate 140. The side plate 140 can provide more support for the retaining element 300, making the force receiving point of the steering lever 200 in reverse rotation away from the joint of the steering lever 200 and the base bar 100 and reducing force at the force receiving point.

Two ends of the steering lever 200 are respectively pivoted to the first side plate 110 and the second side plate 120. The limiting hole 150 is located in the range defined by the side plates 110, 120, 130, and 140.

In a preferable embodiment, starting from the joint of the steering lever 200, the steering lever 200 is extended along the length direction towards the base bar 100 to form a supporting segment 210, and the steering lever 200 is cooperated with the side plate 130 and the retaining element 300 through the supporting segment 210 to achieve unfolding state and the folding state of the steering lever 200. With this configuration, the force receiving point of the steering lever 200 in forward rotation is away from the joint of the steering lever 200 and the base bar 100 and reduces force at the force receiving point.

In order to facilitate the steering lever 200 being rotated relative to the base bar 100, a side of the end of the supporting segment 210 facing the side plate 130 is roundly chamfered. In this way, during rotation from the folding state to the unfolding state of the steering lever, the retaining element 300 is pushed towards the elastic element 320 until located between the retaining element 300 and the side plate 130, where the retaining element 300 is abutted against the side of the retaining element 300 opposite to the side abutted against the side plate 130 under the force of the elastic element 320, the retaining element 300 thus is restricted to rotate reversely or backward.

It should be noted that the longer the length of the supporting segment 210 of the steering lever 200, the easier it is to rotate. In a more preferably embodiment, the side plate 140 is provided with an avoiding groove 141 corresponding to the supporting segment, especially for passing through the supporting segment 210 of the steering lever 200. In this way, the supporting segment 210 can be designed much longer without increasing distance between the side plates 130 and 140.

In a preferable embodiment, the end of the retaining element 300 close to the steering lever 200 is extended along the base bar 100 to form a guide protrusion 340 which is configured to guide the retaining element 300 cooperated with the limiting hole 150. The configuration of the guide protrusion 340 can further prevent the retaining element 300 from wobbling in the limiting hole 150. More preferably, two limiting holes 150 are provided, which are respectively arranged in the side plates 110 and 120, correspondingly the two sides of the end of the retaining element 300 close to the steering lever 200 is respectively extended along the base bar 100 to form a guide protrusion 340. That is there is a gap between the two guide protrusions 340.

In this embodiment, the retaining element 300 and the limiting holes 150 are both in flat shape, which facilitates guiding. The supporting segment 210 of the steering lever 200 passing through the gap between the two guide protrusions 340 when the steering lever 200 is at the unfolded state.

Referring back to FIG. 5, an unlocking plate 310 is further provided according to a preferable embodiment, through which the retaining element 300 can be moved manually, with at least portion of the unlocking plate 310 protruded outside from the retaining element 300. The unlocking plate 310 is connected to the guide protrusion 340 through fasteners. With the unlocking plate 310, the retaining element 300 can be moved manually to lock or unlock rotation of the steering lever 200.

Preferably, the unlocking plate 310 is always located outside the limiting hole 150.

Figure 9:
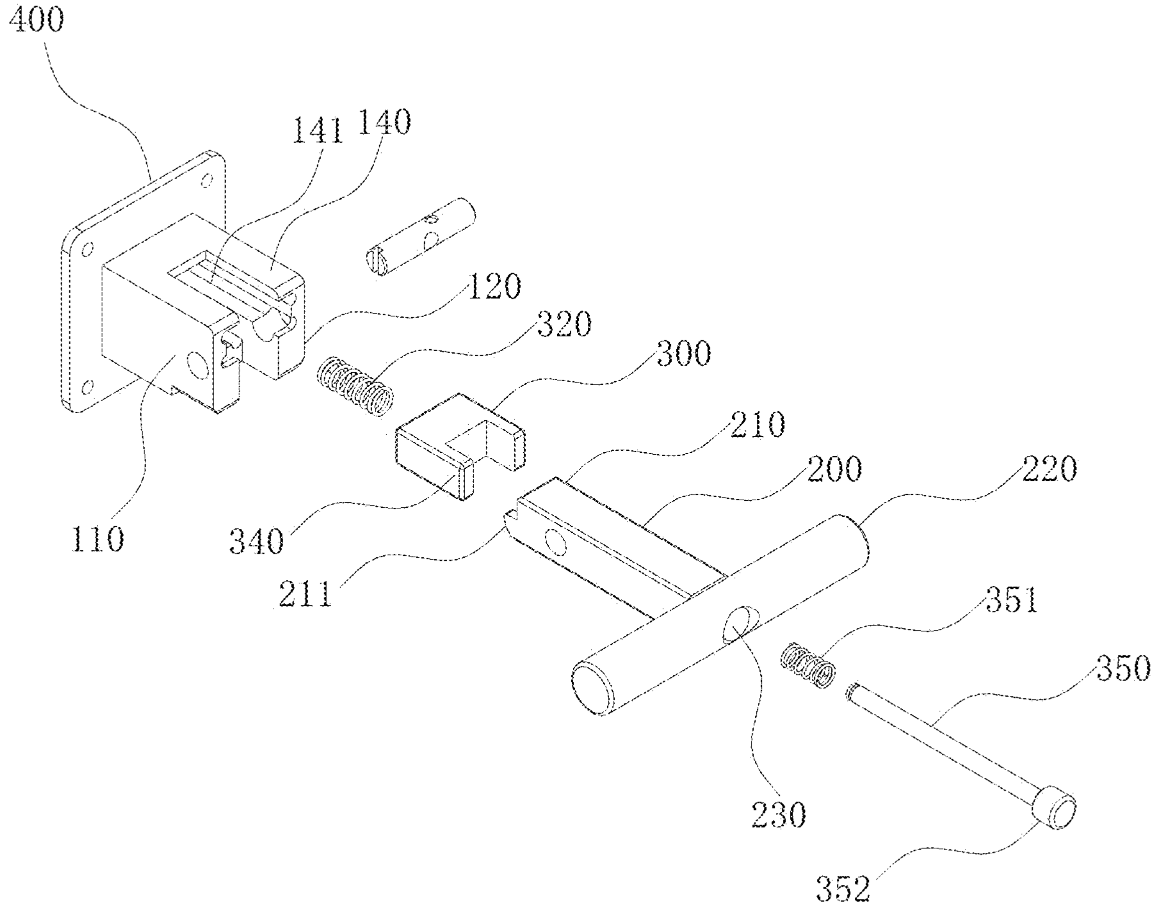
FIG. 9 is an exploded view of a foldable handle according to another embodiment of the present invention, with an alternative unlocking mechanism.
Figure 10:
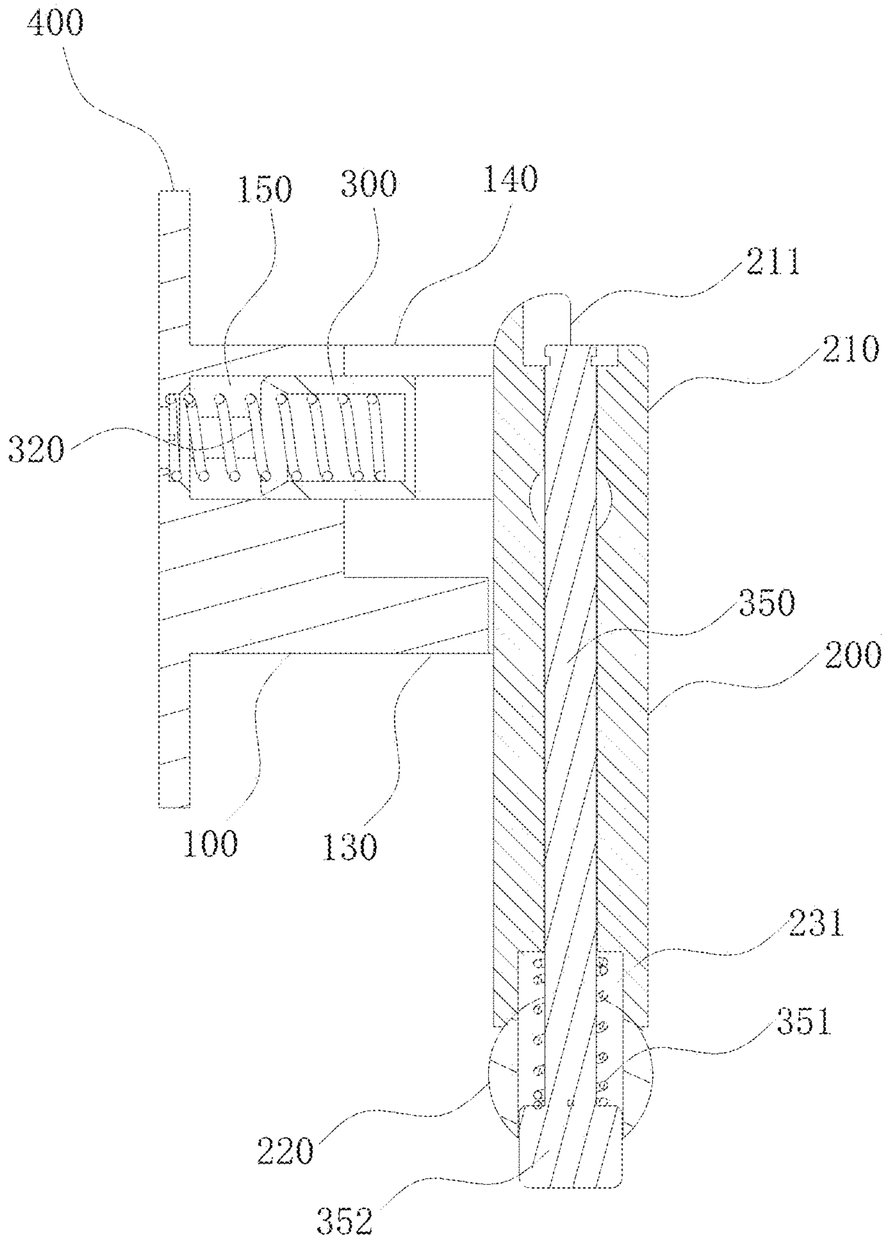
FIG. 10 is a cutaway view of the foldable handle of FIG. 9 at a folding state, along a length direction of a base bar of the foldable handle.
Figure 11:
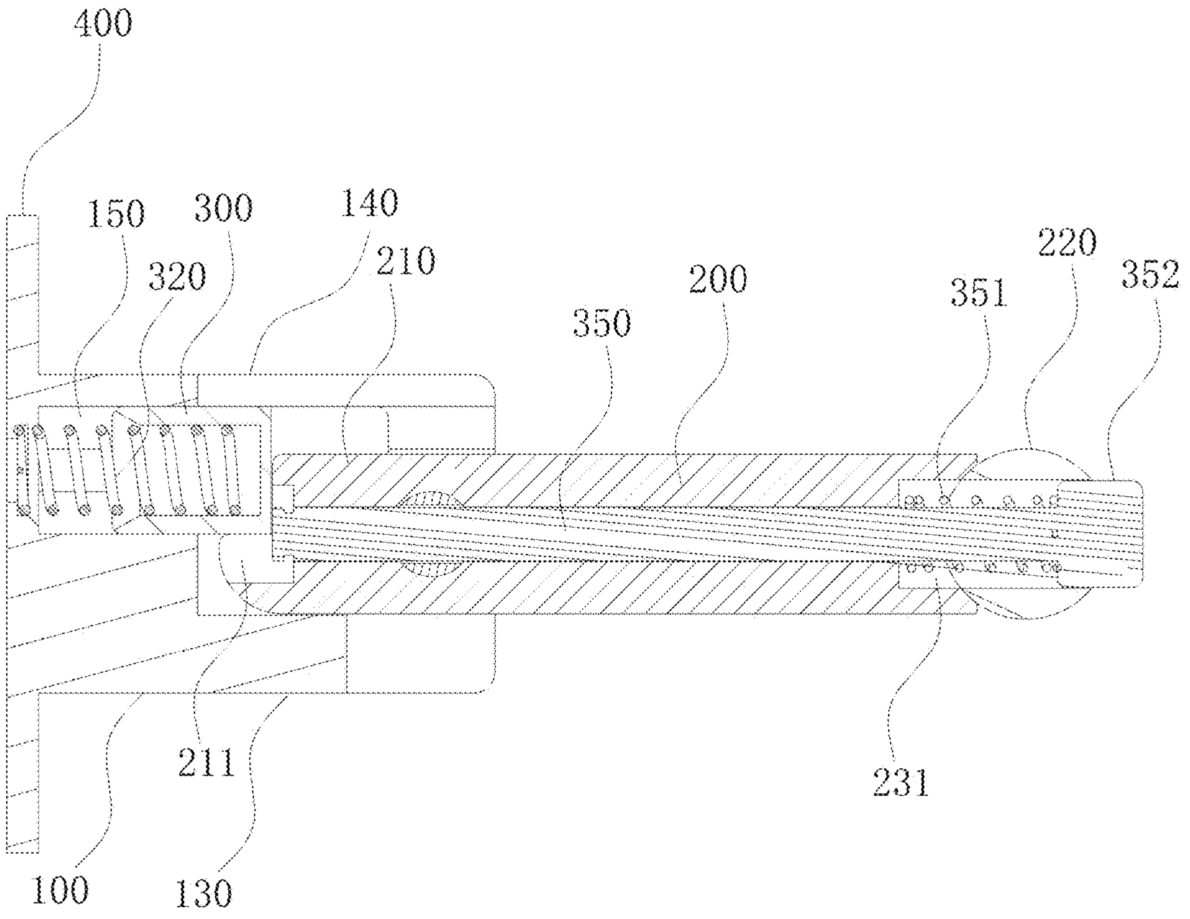
FIG. 11 is a cutaway view of the foldable handle of FIG. 9 at an unfolding state, along a length direction of a base bar of the foldable handle.

FIGS. 9 to 11 illustrates a foldable handle according to another embodiment with an alternative unlocking mechanism. In this embodiment, the supporting segment 210 of the steering lever 200 has a supporting shoulder 211. When the steering lever 200 is at the unfolding state, the retaining element 300 is abutted against the supporting shoulder 211 to restrict backward rotation of the steering lever 200. In addition, along its length direction the steering lever 200 forms a penetrating hole 230 penetrating the end surface of the supporting segment 210, an unlocking bar 350 is provided in the penetrating hole 230, which can reach out the penetrating hole 230 to push the retaining element 300 to move from the supporting shoulder 211 and thus release restriction of the retaining element 300 to the steering lever 200. In this way, the unlocking mechanism is concealed, which is more aesthetic pleasing as well as space-saving, also avoiding injury to the users caused by scratching from the unlocking mechanism.

Preferably, the penetrating hole 230 is penetrated both the end surfaces of the supporting segment 210 and the supporting shoulder 211. The unlocking bar 350 can push the retaining element 300 along the penetrating hole 230 to move until not abutted against the supporting shoulder 211 to complete unlocking. With the penetrating hole 230 penetrated both the end surfaces of the supporting segment 210 and the supporting shoulder 211, it makes the center of the penetrating hole 230 and the steering lever 200 coincide, which can reduce thickness of the steering lever 200 while ensuring strength thereof.

Referring to FIG. 10 and FIG. 11, the end of the penetrating hole 230 away from the supporting shoulder 211 has a widening section 231, in which a reset spring 351 is arranged, and the end of the unlocking bar 350 away from the supporting shoulder 211 has an expanding portion 352, the unlocking bar 350 is run through the reset spring 351 with the expanding portion 352 abutted against the reset spring 351. In this way, the unlocking bar 350 will be automatically reset by the reset spring 351 after it is pressed to unlock the retaining element 300, avoiding influence on rotation of the steering lever 200.

In order to fix the unlocking bar 350 in the penetrating hole 230 and avoid the unlocking bar 350 moving from the penetrating hole 230, the end of the unlocking bar 350 away from the widening section 231 has a fastener, preferably a circlip.

Referring to FIGS. 1 to 11, a base plate 400 for fastening the foldable handle is further included. The end of the base bar 100 away from the steering lever 200 is connected to the base plate 400. With configuration of the base plate 400, it makes the foldable handle to be an independent component, so that the foldable handle can be fastened only by fastening the base plate 400, which is user-friendly for fastening the handle.

The base bar 100 and the base plate 400 is preferably integrated to ensure strength of them.

The base bar 100 and the base plate 400 are preferably perpendicular to each other.

Referring back to FIGS. 1 to 4, in the case that the retaining element 300 is in form of a movable sleeve, a fastened plate 500 which is snugly fitted and fastened to the base plate 400 is further provided for mounting the guide bar 410 for guiding movement of the movable sleeve. The guide bar 410 and the fastened plate 500 are preferably integrated, which facilitates process by die casting. The base plate 400 is processed separately by machining, which ensures strength of the base plate 400 and material saving. In this case, the elastic element 320 is abutted with the fastened plate 500.

The fastened plate 500 has an avoiding hole 510 corresponding to the base bar 100.

Preferably two guide bars 410 are provided at the two opposite sides of the avoiding hole 510.

Of cause, the fastened plate 500 is not provided in some embodiments. In this case, the guide bar 410 is directly arranged on the base plate 400.

Referring to FIGS. 1 to 11, the end of the steering lever 200 away from the base bar 100 is connected with a holding bar 220 which is substantially perpendicular to the steering lever 200. The holding bar 220 facilitates users holding and operating the steering lever 200 to lift the object having the handle in a comfortable way.

In the embodiment of FIGS. 1 to 4, the side of the holding bar 220 facing the steering lever 200 forms a plurality of recess portion 221 for users holding.

The holding bar 220 is preferably coated with an anti-slip rubber sleeve.

Figure 12:
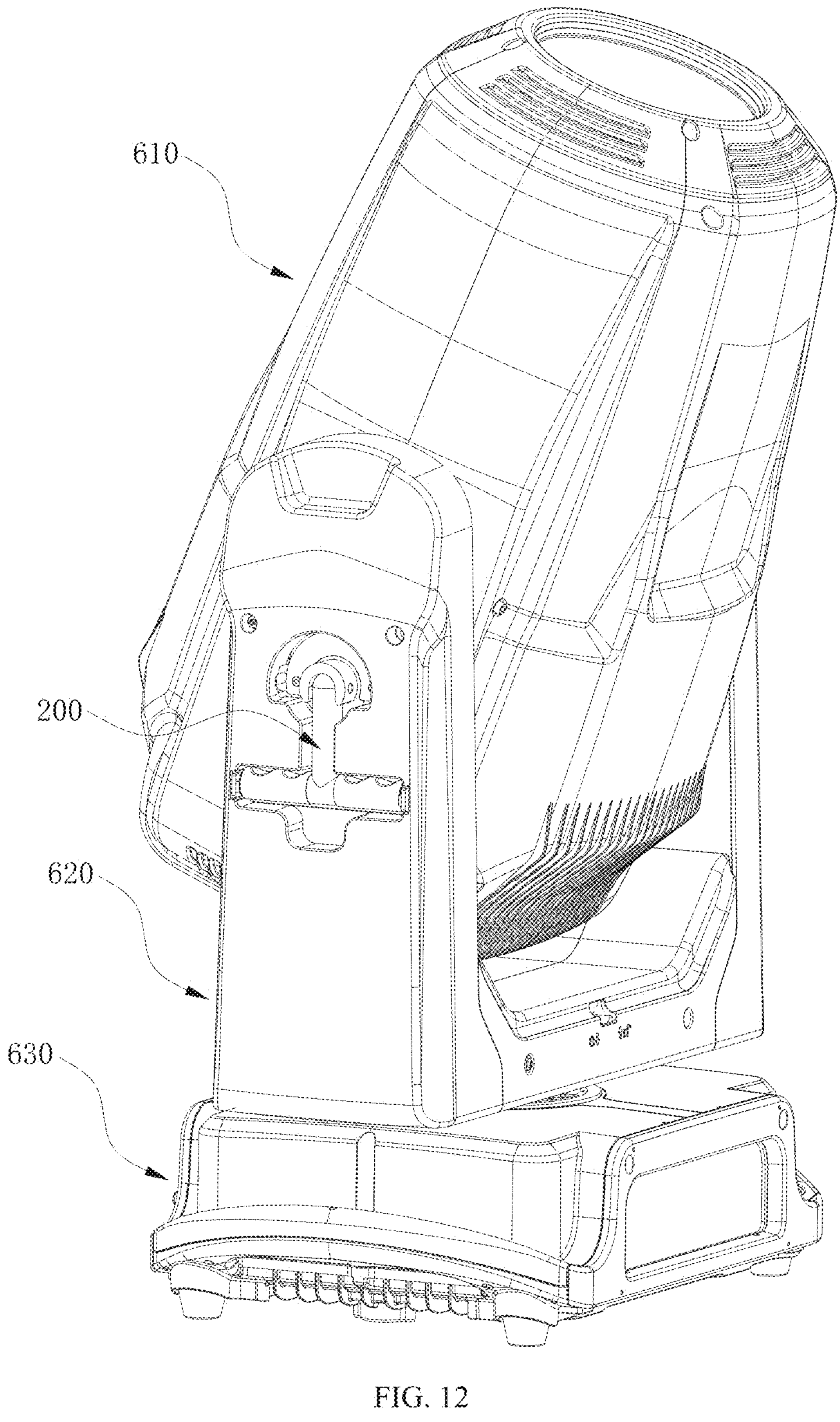
FIG. 12 is a perspective view of a stage light fixture according to an embodiment of the present invention.
Figure 13:
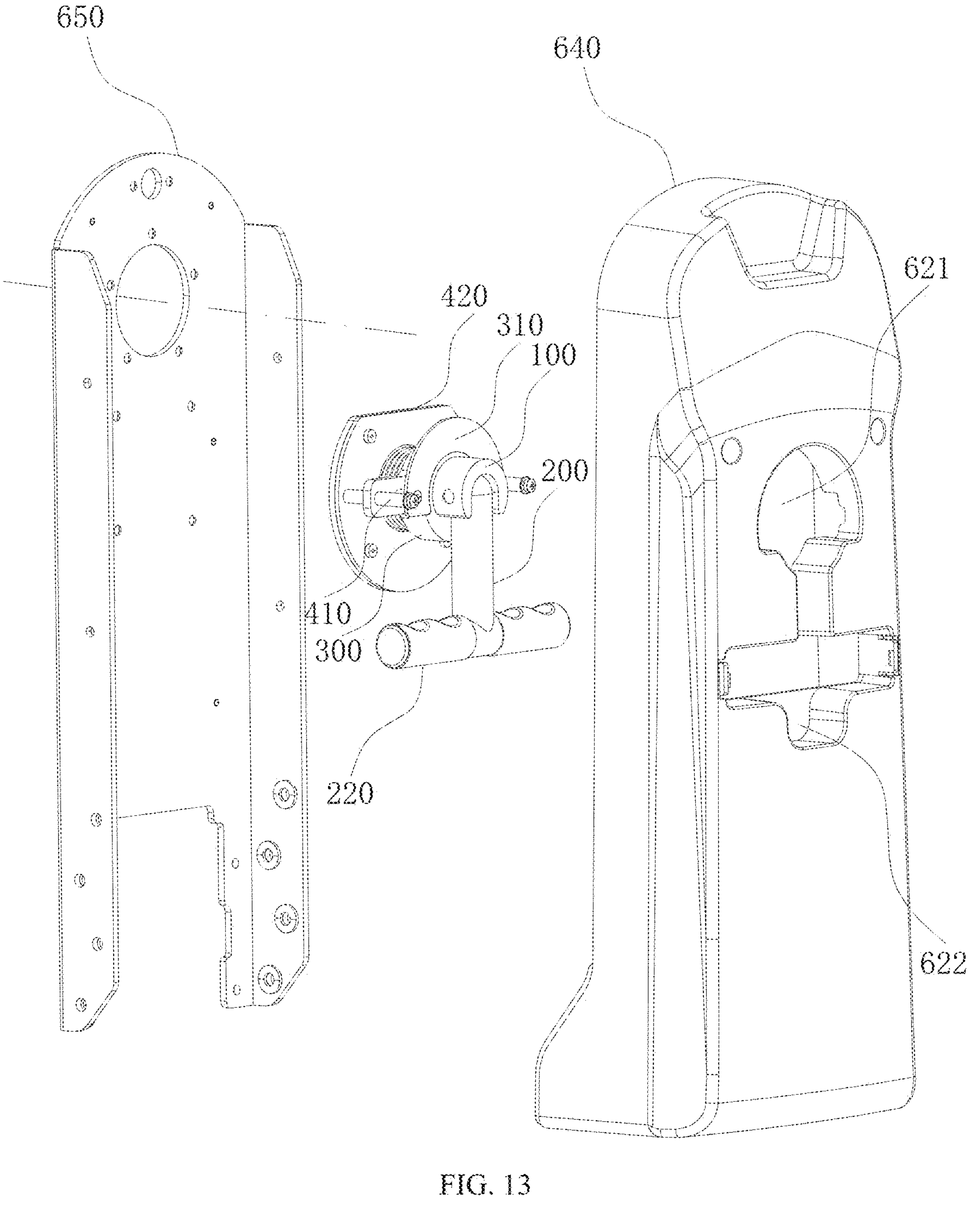
FIG. 13 is a partially exploded view of the stage light fixture of FIG. 12, with some components omitted.

FIGS. 12 and 13 provide a stage light fixture with the foldable handle mentioned above, which includes a light head 610 for project light beams, a supporting arm 620 for supporting the light head 610 to rotate, and a base 630 for supporting the supporting arm 620 to rotate, the foldable handle being arranged at the light head 610, the supporting arm 620, and/or the base 630.

In this embodiment, the foldable handle is arranged at the supporting arm 620, the rotating axis of the light head 610 is substantially perpendicular to the rotating axis of the supporting arm 620 to achieve lighting projection from the light head 610 at any angles.

The handle is usually fastened on the housing of the light head 610, the supporting arm 620, and/or the base 630 through the base plate 400 of the handle, especially on the sheet metal parts 650.

The handle is preferably arranged at the supporting arm 620 and below the rotating axis of the light head 610. As the rotating axis of the light head 610 is usually close to the center of gravity of the stage light fixture, such configuration can avoid overturning when moving the stage light fixture. In addition, there are enough spaces below the rotating axis of the light head 610 where the handle can be arranged easily.

In the case that the handle has the base plate 400, the base plate 400 is provided with an avoiding notch 420 corresponding to the rotating axis of the light head 610, so that the handle can be arranged as close as possible to the rotating axis of the light head 610. In this embodiment, the base plate 400 is a disc with a chamfered edge, the chamfered edge forms the avoiding notch 420.

The housing 640 of the supporting arm 620 is provided with an accommodating groove 621 for receiving the handle. Therefore, the handle can be concealed, which is more aesthetic pleasing.

In the present embodiment, the whole handle is received in the accommodating groove 621 without protruding the surface of the housing 640.

The housing is preferably further provided with an avoiding opening 622 which facilitates fingers of the users to stretch and hold the steering lever 200, especially the holding bar 220. The avoiding opening 622 in the embodiment is in communication with the accommodating groove 621.

Obviously, the above-mentioned embodiments of the present invention are only examples for clearly illustrating the present invention, rather than limiting the mode of implementation of the present invention. For those of ordinary skill in the art, changes or alterations in other different forms can also be made on the basis of the above description. It is not needed and also not possible to list all the modes of implementation here. Any modification, equivalent replacement, improvement, etc. made within the spirit and principle of the present invention shall be included within the protection scope of the claims of the present invention.

What is claimed is:

1. A foldable handle, comprising a base bar;

a steering lever pivoted to the base bar, wherein the steering lever has two states relative to the base bar, including a folding state where the steering lever is substantially perpendicular to the base bar and an unfolding state where the steering lever is substantially in line with the base bar, and the steering lever is configured in a way that in the unfolding state a first side of the steering lever is blocked by a side plate protruded from an end of the base bar to restrict the steering lever to rotate forward; and a movable retaining element, wherein the retaining element is configured to move, in the unfolding state of the steering lever, to be abutted against a second side of the steering lever opposite to the first side blocked by the side plate to restrict the steering lever to rotate backward.

2. The foldable handle according to claim 1, wherein the retaining element is further configured to be always abutted against the steering lever under action of an elastic element during rotation of the steering lever and be automatically moved to be abutted against the second side of the steering lever in the unfolding state of the steering lever.

3. The foldable handle according to claim 1, wherein the retaining element is in form of a movable sleeve which is sleeved on the base bar, the movable sleeve is configured to move along a length direction of the base bar in the unfolding state of the steering lever to be sleeved on the side plate of the base bar and abutted against the second side of the steering lever.

4. The foldable handle according to claim 3, wherein a guide bar is further provided for guiding movement of the movable sleeve.

5. The foldable handle according to claim 3, wherein an unlocking plate is further provided to manually move the movable sleeve, with at least portion of the unlocking plate protruded outside from the movable sleeve.

6. The foldable handle according to claim 1, wherein an end of the base bar is recessed to form a limiting hole which is configured to support the retaining element and guide movement of the retaining element, and the retaining element is configured to move along the limiting hole to abutted against the second side of the steering lever in the unfolding state of the steering lever.

7. The foldable handle according to claim 6, wherein an additional side plate opposite to the side plate restricting forward rotation of the steering lever is further formed, and a side of the retaining element away from the steering lever is abutted against the additional side plate in the unfolding state of the steering lever.

8. The foldable handle according to claim 6, wherein starting from a joint of the steering lever and the base bar, the steering lever is extended along a length direction thereof towards the base bar to form a supporting segment, and the steering lever is cooperated with the side plate and the retaining element through the supporting segment.

9. The foldable handle according to claim 8, wherein a side of an end of the supporting segment facing the side plate is roundly chamfered.

10. The foldable handle according to claim 8, wherein an additional side plate opposite to the side plate restricting forward rotation of the steering lever is further formed, a side of the retaining element away from the steering lever is abutted against the additional side plate in the unfolding state of the steering lever, and the additional side plate is provided with an avoiding groove corresponding to the supporting segment of the steering lever.

11. The foldable handle according to claim 6, wherein an end of the retaining element close to the steering lever is extended along the base bar to form a guide protrusion which is configured to guide the retaining element cooperated with the limiting hole.

12. The foldable handle according to claim 11, wherein an unlocking plate connected to the guide protrusion is further provided to manually move the retaining element, with at least portion of the unlocking plate protruded outside from the retaining element.

13. The foldable handle according to claim 6, wherein the supporting segment of the steering lever has a supporting shoulder, in the unfolding state of the steering lever, the retaining element is abutted against the supporting shoulder to restrict backward rotation of the steering lever; a penetrating hole is formed along a length direction of the steering lever and penetrated an end surface of the supporting segment, an unlocking bar is provided in the penetrating hole, which is able to reach out the penetrating hole to push the retaining element to move from the supporting shoulder to release restriction of the retaining element to the steering lever.

14. The foldable handle according to claim 13, wherein the penetrating hole is penetrated both end surfaces of the supporting segment and the supporting shoulder.

15. The foldable handle according to claim 13, wherein an end of the penetrating hole away from the supporting segment has a widening section in which a reset spring is arranged, an end of the unlocking bar away from the supporting segment has an expanding portion, and the unlocking bar is run through the reset spring with the expanding portion abutted against the reset spring.

16. The foldable handle according to claim 1, wherein a base plate for fastening the foldable handle is further included, and an end of the base bar away from the steering lever is connected to the base plate.

17. The foldable handle according to claim 1, wherein an end of the steering lever away from the base bar is connected with a holding bar which is substantially perpendicular to the steering lever.

18. A stage light fixture, comprising a light head for project light beams; a supporting arm for supporting the light head to rotate; a base for supporting the supporting arm to rotate; and the foldable handle according to claim 1, the foldable handle being arranged at the light head, the supporting arm, or the base.

19. The stage light fixture according to claim 18, wherein the foldable handle is arranged at the supporting arm and below a rotating axis of the light head relative to the supporting arm.

20. The stage light fixture according to claim 19, wherein a housing of the supporting arm is provided with an accommodating groove for receiving the foldable handle.

* * * * *